(12) United States Patent
Dosluoglu

(10) Patent No.: US 7,443,432 B2
(45) Date of Patent: Oct. 28, 2008

(54) SUPPRESSION OF NOISE IN PIXEL $V_{DD}$ SUPPLY

(75) Inventor: Taner Dosluoglu, New York, NY (US)

(73) Assignee: Digital Imaging Systems GmbH, Kirchheim/Teck-Nabern (DE)

(*) Notice: Subject to any disclaimer, the term of this patent is extended or adjusted under 35 U.S.C. 154(b) by 860 days.

(21) Appl. No.: 11/028,745

(22) Filed: Jan. 4, 2005

(65) Prior Publication Data

US 2005/0275650 A1    Dec. 15, 2005

Related U.S. Application Data

(60) Provisional application No. 60/579,943, filed on Jun. 15, 2004.

(51) Int. Cl.
*H04N 9/64* (2006.01)

(52) U.S. Cl. ..................................... 348/245
(58) Field of Classification Search ................. 348/245, 348/243, 241, 222.1
See application file for complete search history.

(56) References Cited

U.S. PATENT DOCUMENTS

| | | | | |
|---|---|---|---|---|
| 4,484,223 A * | 11/1984 | Tsunekawa | .................. | 348/245 |
| 4,649,430 A * | 3/1987 | Hynecek | ...................... | 348/245 |
| 4,700,231 A * | 10/1987 | Matsumoto | .................. | 348/245 |
| 5,528,642 A * | 6/1996 | Hirama | .......................... | 377/60 |
| 6,344,877 B1 | 2/2002 | Gowda et al. | ................ | 348/245 |
| 6,452,152 B1 | 9/2002 | Yang | ........................ | 250/208.1 |
| 6,483,541 B1 | 11/2002 | Yonemoto et al. | ........... | 348/302 |
| 6,507,365 B1 | 1/2003 | Nakamura et al. | .......... | 348/296 |
| 6,982,705 B2 * | 1/2006 | Kunimi et al. | .............. | 345/204 |
| 7,148,524 B2 * | 12/2006 | Ozumi | ........................ | 257/223 |
| 2003/0160772 A1* | 8/2003 | Kunimi et al. | .............. | 345/204 |

\* cited by examiner

*Primary Examiner*—David Ometz
*Assistant Examiner*—Nicholas G Giles
(74) *Attorney, Agent, or Firm*—Saile Ackerman LLC; Stephen B. Ackerman; Larry J. Prescott

(57) ABSTRACT

A circuit and method for correcting for power supply voltage noise using two dummy pixels in each row of pixels of an imager having a number of pixels arranged in rows and columns are described. The dummy pixels are driven by the same power supply as the active pixels but do not have the capability to sense light energy. The first dummy pixel is read at the time the active pixels in a row are reset and stores a signal in a first dummy register related to the voltage level of the power supply at the time the active pixels are reset. The second dummy pixel is read at the time the active pixels in the row are read and stores a signal in a second dummy register related to the voltage level of the power supply at the time the active pixels are read. The signals in the first storage register and second storage register can then be used to correct the signals from the active pixels in the row for the effect of noise caused by power supply voltage level fluctuations.

20 Claims, 3 Drawing Sheets

SUPPRESSION OF NOISE IN PIXEL $V_{DD}$ SUPPLY

This patent application claims priority to the following U.S. Provisional Patent Application, herein incorporated by reference:
 60/579,943 filed Jun. 15, 2004.

BACKGROUND OF THE INVENTION (1) Field of the Invention

This invention relates to pixel circuits and methods for suppression of noised in a pixel array caused noise in the $V_{DD}$ supply.

(2) Description of the Related Art

U.S. Pat. No. 6,507,365 B1 to Nakamura et al. describes a solid state imaging device which uses two dummy pixel rows added to the original pixel rows added for the purpose of functioning as loads.

U.S. Pat. No. 6,483,541 B1 to Yonemoto et al. describes a solid state imaging device and signal processing method for the correction of fixed pattern noise.

U.S. Pat. No. 6,452,152 to Yang describes a sense amplifier, for use with image sensors, which uses reference generation using precision analog references.

U.S. Pat. No. 6,344,877 B1 to Gowda et al. describes an image sensor which uses one or more dummy pixels to produce a reference signal used to compensate for errors within the devices of the main pixel.

SUMMARY OF THE INVENTION

Noise in supply voltage, such as $V_{DD}$ supplies, used to drive imager pixel circuits will be transferred to the imager output and cause degradation in the quality of the resulting image.

It is a principle objective of this invention to provide an active pixel circuit which has the capability of making corrections for noise in the voltage level of the power supply used to drive active pixel circuits in an imager.

It is another principle objective of this invention to provide a method of making corrections for noise in the voltage level of the power supply voltage used to drive active pixel circuits in an imager.

These objectives are achieved by using two dummy pixels, a first and second dummy pixel, in each row of active pixels in an imager having a number of active pixels arranged in rows and columns. The dummy pixels are driven by the same power supply, such as a $V_{DD}$ supply, as the active pixels in the row, but do not have the capability to sense light energy. The first dummy pixel is read at the time the active pixels in the row are reset and the results of this readout are stored in a first dummy register. This places a signal in the first dummy register related to the voltage level of the power supply at the time the active pixels in the row are reset. The second dummy pixel is read at the time the active pixels in the row are read and the results of this readout are stored in a second dummy register. This places a signal in the second dummy register related to the voltage level of the power supply at the time the active pixels in the row are read. The signals in the first dummy register and second dummy register can then be used to determine any shift in voltage level of the power supply between the time the pixels in the row are reset and the time the pixels in the row are read. This determination of any voltage level shift can be used to correct for the effect of the shift in power supply voltage level on the signals from the active pixels in the row.

DESCRIPTION OF THE PREFERRED EMBODIMENTS

Figure 1:
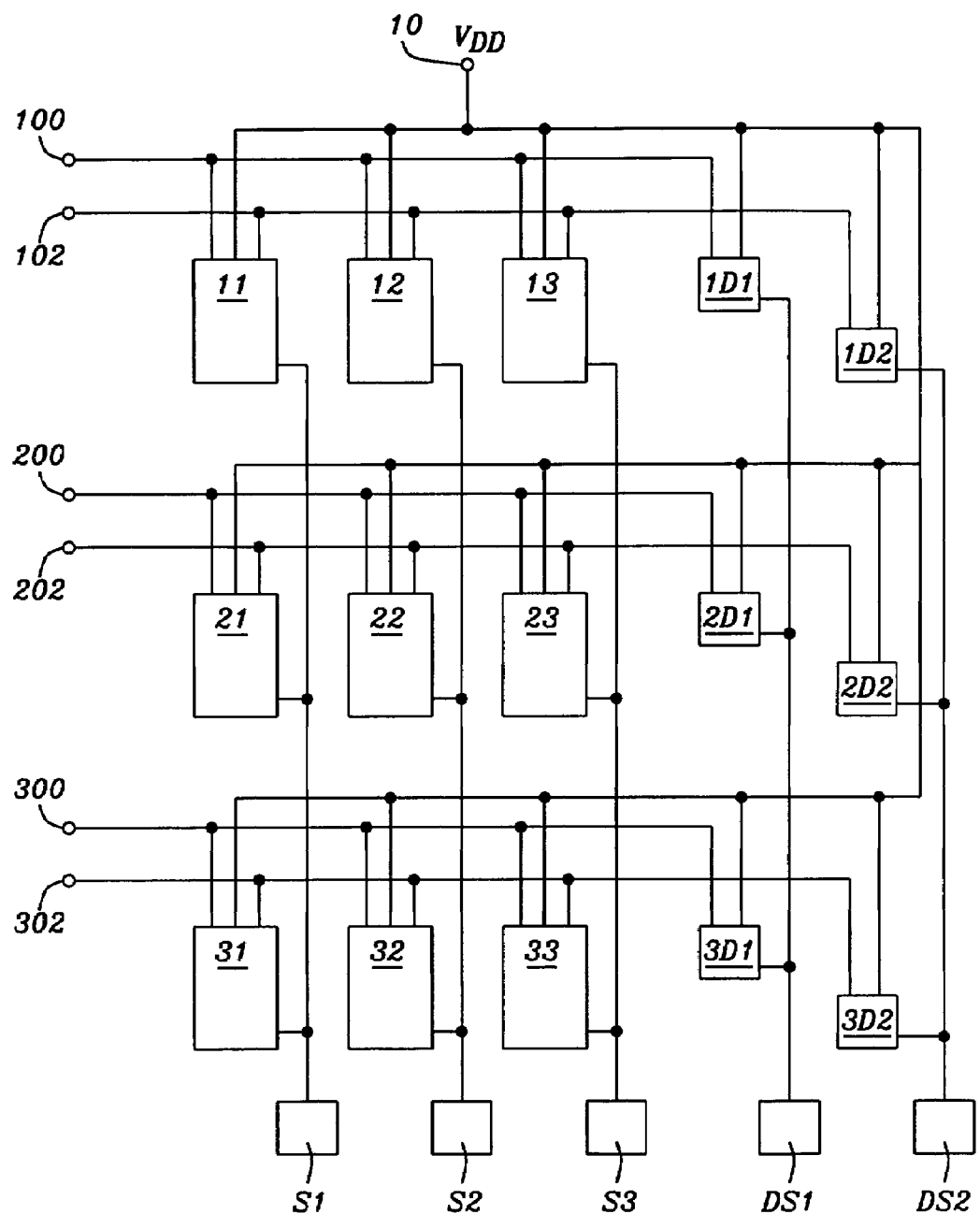
FIG. 1 shows a block diagram of a three by three array of pixels having two dummy pixels in each row of pixels.

Refer to FIGS. 1-4 for a description of the preferred embodiments of this invention. FIG. 1 shows a schematic diagram of a pixel array showing a three column by three row array of active pixels. A key part of this invention is to add a first dummy pixel and a second dummy pixel to each row of active pixels. The active pixels each have a photosensitive device, such as a photodiode, while the dummy pixels do not have a photo sensitive device. The first and second dummy pixels are driven by the same power supply, such as a $V_{DD}$ supply, as the active pixels. A column register is in electrical communication with the active pixels in each of the columns of the array. A first dummy register is in electrical communication with all of the first dummy pixels of the array. A second dummy register is in electrical communication with all of the second dummy pixels of the array. A reset line for each of the rows of active pixels of the array is in electrical communication with each of the active pixels and the first dummy pixel in each of the rows of the array. The reset line controls the reset of the active pixels in the row and the readout of the first dummy pixel. A row select line for each of the rows of active pixels of the array is in electrical communication with each of the active pixels and the second dummy pixel in each of the rows of the array. The row select line controls the readout of the active pixels in the row and the readout of the second dummy pixel.

FIG. 1 shows a block diagram of an example of a three by three array of active pixels comprising a first row of active pixels 11, 12, and 13 in addition to a first dummy pixel 1D1 and a second dummy pixel 1D2; a second row of active pixels 21, 22, and 23 in addition to a first dummy pixel 2D1 and a second dummy pixel 2D2; and a third row of active pixels 31, 32, and 33 in addition to a first dummy pixel 3D1 and a second dummy pixel 3D2. A first reset line 100 is connected to the first row of active pixels 11, 12, and 13 and the first dummy pixel in the first row 1D1; a second reset line 200 is connected to the second row of active pixels 21, 22, and 23 and the first dummy pixel in the second row 2D1; and a third reset line 300 is connected to the third row of active pixels 31, 32, and 33 and the first dummy pixel in the third row 3D1. A first row select line 102 is connected to the first row of active pixels 11, 12, and 13 and the second dummy pixel in the first row 1D2; a second row select line 202 is connected to the second row of active pixels 21, 22, and 23 and the second dummy pixel in the second row 2D2; and a third row select line 302 is connected to the third row of active pixels 31, 32, and 33 and the second dummy pixel in the third row 3D2. The first column of active pixels 11, 21, and 31 are connected to the first column storage register S1; the second column of active pixels 12, 22, and 32 are connected to the second column storage register S2; and the third column of active pixels 13, 23, and 33 are connected to the third column storage register S3; the first dummy pixels 1D1, 2D1, and 3D1 are connected to a first dummy storage register DS1; and the second dummy pixels 2D1, 2D2, and 3D2 are connected to a second dummy storage register DS2. A power supply, in this example a $V_{DD}$ Supply, supplies all of the active and dummy pixels in the array, as shown in FIG. 1. While a three by three array of pixels is shown in FIG. 1, those skilled in the art will recognize that an array of any desired number of rows and any desired number of columns can be used, such as 360 by 640, 720 by 1280, 1080 by 1920, or any other desired array of rows and columns. To extend the array additional pixels are added to number of rows and columns with pixels while retaining one first dummy pixel and one second dummy pixel in each row. A three by three array of pixels is described here to simplify the description, however those skilled in the art will readily be able to expand the description to any desired array.

In the operation of the array of pixels shown in FIG. 1 each of the active pixels in a row, under the control of the reset line for that row of pixels, is reset and the first dummy pixel for that row stores a signal, related to the value of the voltage of the power supply at the time the active pixels are reset, in the first dummy register DS1. After a charge integration period each of the active pixels in a row, under the control of the row select line for that row of pixels, are read and store a signal in the column registers S1, S2, and S3 and the second dummy pixel for that row stores a signal, related to the value of the voltage of the power supply at the time the active pixels are read, in the second dummy register DS2. The signals in the first dummy register DS1 and the second dummy register DS2 can then be used to correct the signals stored in the column registers S1, S2, and S3 for noise in the voltage of the power supply, such as $V_{DD}$.

Figure 2:
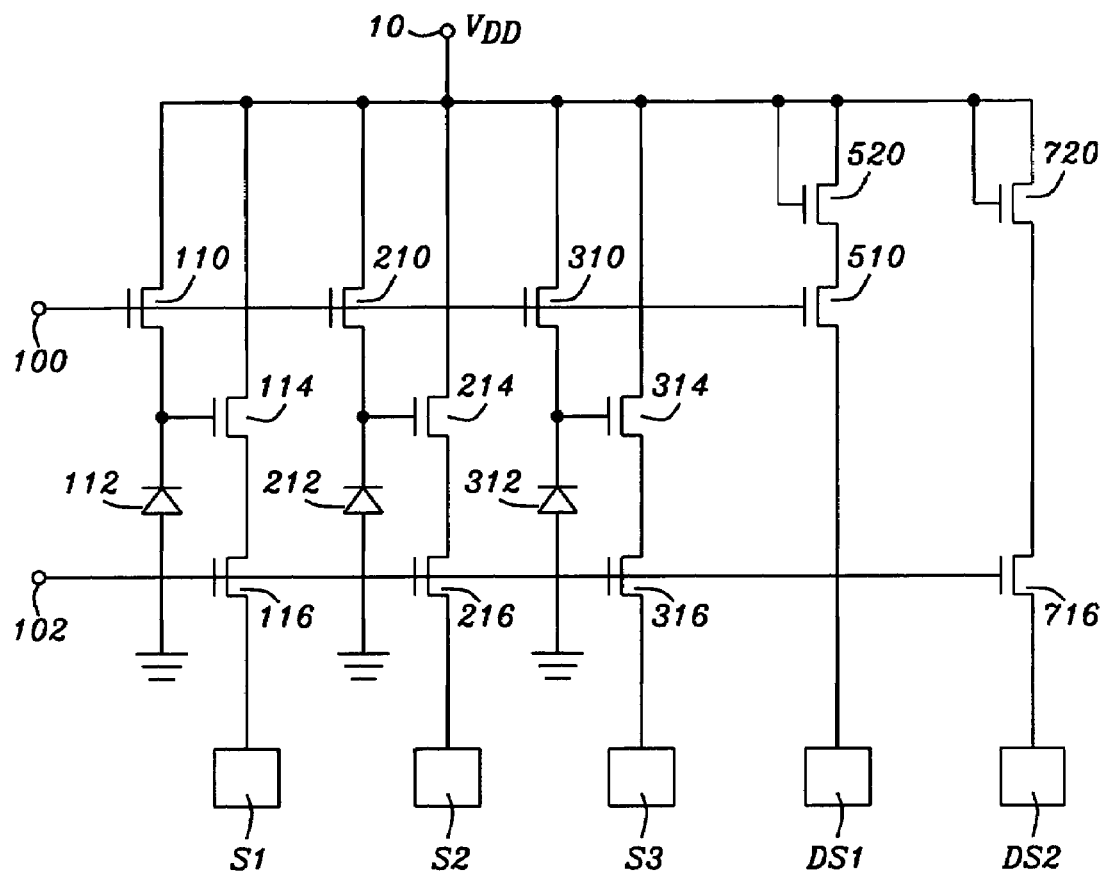
FIG. 2 shows a schematic diagram of one of the rows of pixels in an imager showing two dummy pixels.

FIG. 2 shows a schematic diagram of one of the rows of pixels, in this example the first row of the array shown in FIG. 1. A single row of pixels is chosen to simplify the description. Those skilled in the art will readily be able to expand the description to any desired array of pixels. The first active pixel in the row comprises a photodiode 112, a reset transistor 110, a readout transistor 114, and a row select transistor 116. The second active pixel in the row comprises a photodiode 212, a reset transistor 210, a readout transistor 214, and a row select transistor 216. The third active pixel in the row comprises a photodiode 312, a reset transistor 310, a readout transistor 314, and a row select transistor 316. The first dummy pixel in the row comprises a buffer transistor 520 and a reset transistor 510. The second dummy pixel in the row comprises a buffer transistor 720 and a row select transistor 716. The drains of the row select transistors 116, 216, and 316 of the active pixels in the row are connected to the column registers S1, S2, and S3 of the three columns of the array. The drain of the reset transistor 510 of the first dummy pixel in the row is connected to the first dummy register DS1. The drain of the row select transistor 716 of the second dummy pixel in the row is connected to the second dummy register DS2. In an actual array the drains of the row select transistors of each of the active pixels in a column of pixels are connected together, the drains of all of the reset transistors for all of the first dummy pixels in the array are connected together, and the drains of all of the row select transistors for all of the second dummy pixels are connected together.

Each row of pixels has a reset line and a row select line. In this example the first row of pixels has a reset line 100 and a row select line 102. The reset line 100 is connected to the gates of each of the reset transistors 110, 210, and 310 for each of the active pixels and to the gate of the reset transistor 510 in the first dummy pixel. The row select line 102 is connected to the gates of each of the row select transistors 116, 216, and 316 for each of the active pixels and to the gate of the row select transistor 716 in the second dummy pixel. The transistors in the array are powered at a power supply node 10, in this example supplied by a $V_{DD}$ supply, as shown in the diagram in FIG. 2.

During reset of the row of pixels the reset line 100 is activated and the row select line 102 is not activated. This turns the reset transistors 110, 210, and 310 of the active pixels on; the reset transistor 510 for the first dummy pixel on; the row select transistors 116, 216, and 316 for the active pixels off; and the row select transistor 716 for the second dummy pixel off. This resets the active pixels in the row and stores a signal related to the value of the $V_{DD}$ supply 10 at the time the pixels in the row are reset in the first dummy register DS1. During readout of the row of pixels the reset line 100 is not activated and the row select line 102 is activated. This turns the reset transistors 110, 210, and 310 of the active pixels off; the reset transistor 510 for the first dummy pixel off; the row select transistors 116, 216, and 316 for the active pixels on; and the row select transistor 716 for the second dummy pixel on. This reads the active pixels in the row; stores a signal related to the amount of light seen by the photodiodes 112, 212, and 312 in the column registers S1, S2, and S3; and stores a signal related to the value of the $V_{DD}$ power supply 10 at the time the pixels in the row are read in the second dummy register DS2.

Figure 3:
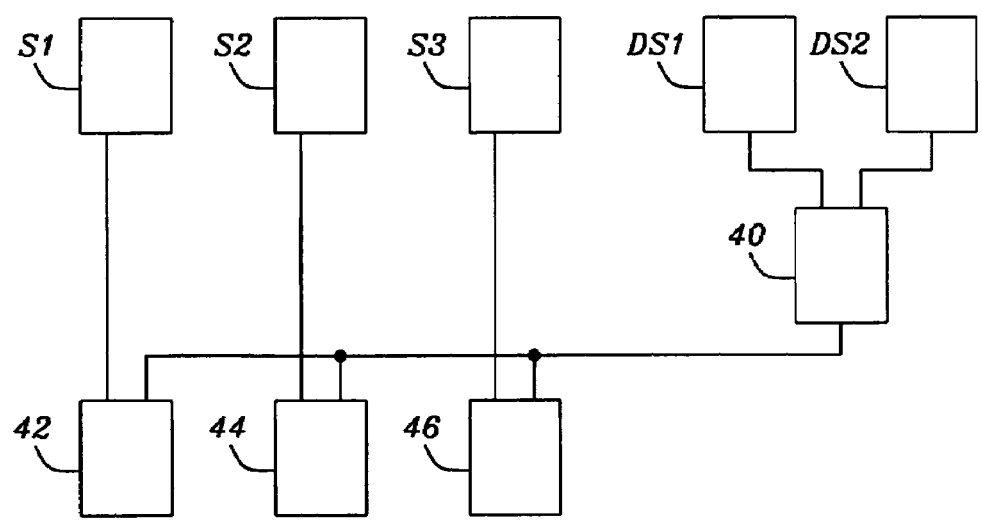
FIG. 3 shows a block diagram of one scheme for correcting imager output signals for noise in the power supply voltage level.

The signals stored in the first dummy register DS1 and the second dummy register DS2 can then be used to correct the signals stored in the column storage registers; S1, S2, and S3; for fluctuations in the $V_{DD}$ power supply 10 between the time the pixels in the row are reset and the time they are read out. FIG. 3 shows an example of one possible method that can be used for this correction. The difference between the signal in the first dummy register DS1 and the second dummy register DS2 can be determined using a subtraction circuit 40. The difference between the signals in the first dummy register DS1 and second Dummy register DS2 can then be added to or subtracted from the signals in the column storage registers S1, S2, and S3 using addition or subtraction circuits 42, 44, and 46 to correct the signals stored in the column storage registers S1, S2, and S3 for differences between the $V_{DD}$ power supply voltage at the time the pixels are reset and read.

Figure 4:
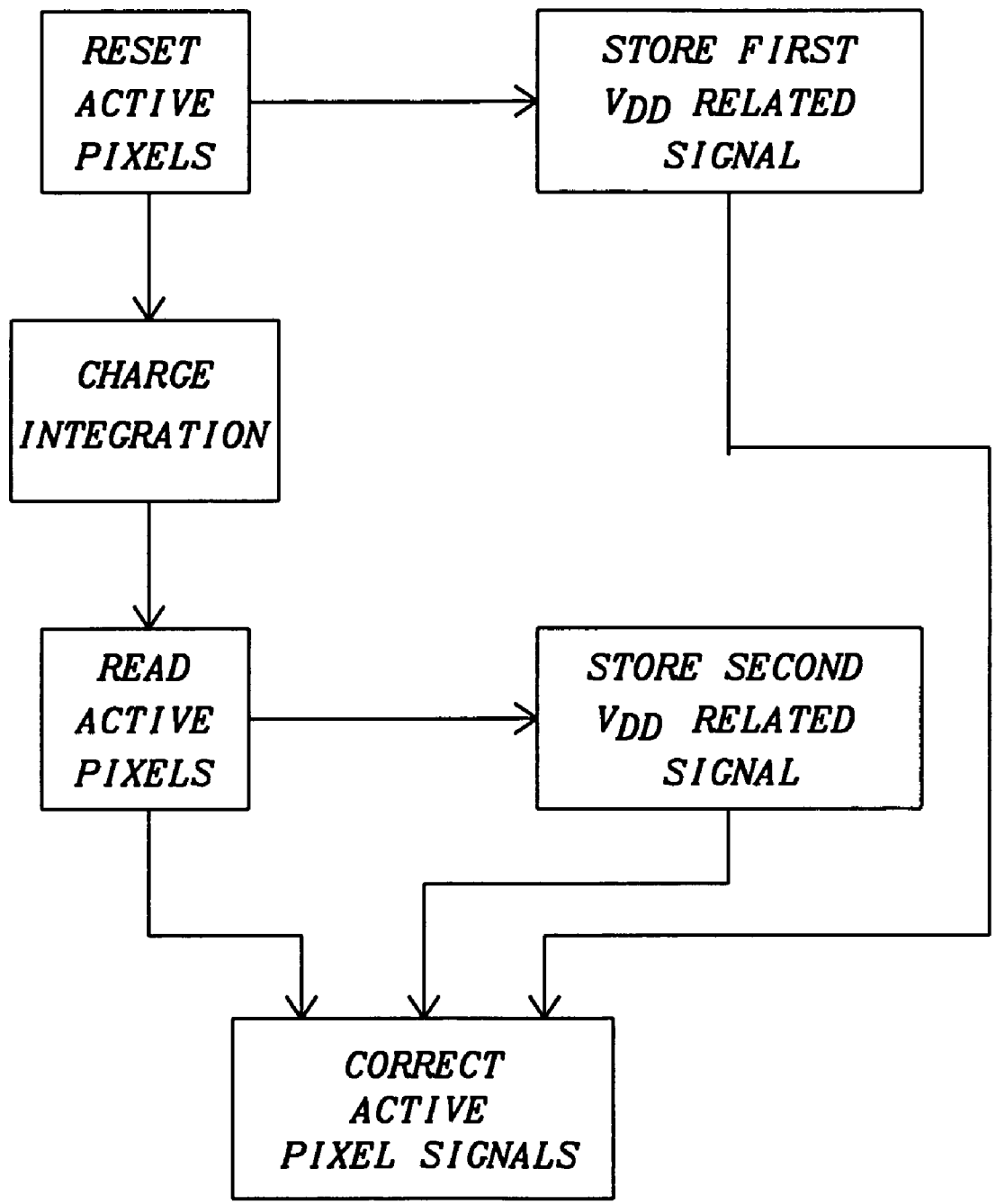
FIG. 4 shows a flow diagram of the method of this invention.

FIG. 4 shows a flow diagram for the method of this invention. The active pixels in a row are first reset, as shown in box 80, and a signal related to the value of the power supply voltage at the time the pixels are reset is stored in the first dummy register using the first dummy pixel, as shown in box 82. The pixels then are subject to a charge integration period, as shown in box 84. The active pixels in a row are then read and the resulting signals are stored in the column registers, as shown in box 86, and a signal related to the value of the power supply voltage at the time the active pixels in the row are read is stored in the second dummy register using the second dummy pixel, as shown in box 88. The signals stored in the column registers are then corrected for changes in power supply voltage between the time the active pixels are reset and the time the active pixels are read, as shown in box 90.

While the invention has been particularly shown and described with reference to the preferred embodiments thereof, it will be understood by those skilled in the art that various changes in form and details may be made without departing from the spirit and scope of the invention.

What is claimed is:

1. A pixel array, comprising:
   a number of active pixel circuits arranged in an array of rows and columns of active pixel circuits, wherein each said active pixel circuit has a photo detector and communicates electrically with a power supply;

a first dummy pixel circuit for each said row of active pixel circuits, wherein each said first dummy pixel circuit does not have a photo detector and communicates electrically with said power supply;

a second dummy pixel circuit for each said row of active pixel circuits wherein each said second dummy pixel circuit does not have a photo detector and communicates electrically with said power supply;

a column storage register for each said column of active pixel circuits wherein each said column storage register is connected to all of said active pixel circuits in that said column of active pixel circuits;

a first dummy storage register, wherein each of said first dummy pixel circuits are connected to said first dummy storage register;

a second dummy storage register, wherein each of said second dummy pixel circuits are connected to said second dummy storage register;

a reset line for each of said rows of active pixel circuits wherein one of said reset lines is connected to each said active pixel circuit and said first dummy pixel circuit in each said row of active pixel circuits, and wherein each of said active pixel circuits in a row of said pixel circuits selected for reset is reset and said first dummy pixel in said row of active pixel circuits selected for reset stores a signal in said first dummy storage register related to the value of the voltage of said power supply at the time said active pixel circuits in said row of pixel circuits selected for reset are reset;

a row select line for each of said rows of active pixel circuits wherein one of said row select lines is connected to each said active pixel circuit and said second dummy pixel in each said row of active pixel circuits, and wherein each of said active pixel circuits in a row of pixel circuits selected for readout is read and stores a signal in that said column register for the same said column of active pixel circuits and said second dummy pixel in said row of pixel circuits selected for readout stores a signal in said second dummy register related to the value of said voltage of said power supply at the time said active pixel circuits in said row of pixel circuits selected for readout are read;

means for determining the difference between said signal stored in said first dummy register and said signal stored in said second dummy register; and means for correcting said signals stored in each of said column storage registers for fluctuations of said voltage of said power supply using said difference between said signal stored in said first dummy register and said signal stored in said second dummy register.

2. The pixel array of claim 1 wherein said photo detector comprises a photodiode and each of said active pixel circuits comprises a first reset transistor and a first row select transistor.

3. The pixel array of claim 2 wherein each of said first reset transistors has a source in electrical communication with said voltage supply.

4. The pixel array of claim 2 wherein each of said first reset transistors in each of said rows of pixel circuits has a gate connected to said reset line for that said row of active pixel circuits.

5. The pixel array of claim 2 wherein each of said first row select transistors has a drain in electrical communication with said column register for that said column of active pixel circuits.

6. The pixel array of claim 2 wherein each of said first row select transistors in each of said rows of pixel circuits has a gate connected to said row select line for that said row of active pixel circuits.

7. The pixel array of claim 1 wherein each of said first dummy pixels comprises a second reset transistor, and wherein each of said second reset transistors in each of said rows of active pixel circuits has a gate connected to said reset line for that said row of active pixel circuits, a source in electrical communication with said power supply, and a drain in electrical communication with said first dummy register.

8. The pixel array of claim 1 wherein each of said second dummy pixels comprises a second row select transistor, and wherein each of said second row select transistors in each of said rows of active pixel circuits has a gate connected to said row select line for that said row of active pixel circuits, a source in electrical communication with said power supply, and a drain in electrical communication with said second dummy register.

9. The pixel array of claim 1 wherein said means for determining the difference between said signal stored in said first dummy register and said signal stored in said second dummy register comprises a subtraction circuit.

10. The pixel array of claim 1 wherein said means for correcting said signals stored in each of said column storage registers for fluctuations of said voltage of said power supply using said difference between said signal stored in said first dummy register and said signal stored in said second dummy register comprises an addition or a subtraction circuit.

11. A method of correcting for noise in a pixel array, comprising:

providing a number of active pixel circuits arranged in an array of rows and columns of active pixel circuits, wherein each said active pixel circuit has a photo detector and is supplied by a power supply;

providing a first dummy pixel for each row of said active pixel circuits, wherein each said first dummy pixel does not have a photo detector and is supplied by said power supply;

providing a second dummy pixel for each row of said active pixel circuits wherein each said second dummy pixel does not have a photo detector and is supplied by said power supply;

providing a column storage register for each said column of active pixel circuits wherein each said column storage register is connected to each of said active pixel circuits in that said column of pixel circuits;

providing a first dummy storage register wherein said first dummy storage register is connected to each of said first dummy pixels;

providing a second dummy storage register wherein said second dummy storage register is connected to each of said second dummy pixels;

providing a reset line for each of said rows of active pixel circuits wherein one of said reset lines is connected to each said active pixel circuit and said first dummy pixel circuit in each said row of active pixel circuits, and wherein each of said active pixel circuits in a row of said pixel circuits selected for reset is reset and said first dummy pixel in said row of pixel circuits selected for reset stores a signal in said first dummy storage register related to the value of the voltage of said power supply at the time said active pixel circuits in said row of active pixel circuits selected for reset are reset;

providing a row select line for each of said rows of active pixel circuits wherein one of said row select lines is connected to each said active pixel circuit and said second dummy pixel circuit in each said row of active pixel circuits, and wherein each of said active pixel circuits in a row of pixel circuits selected for readout is read and stores a signal in that said column register for the same said column of active pixel circuits and said second dummy pixel in said row of active pixel circuits selected for readout stores a signal in said second dummy register related to the value of said voltage of said power supply at the time said active pixel circuits in said row of pixel circuits selected for readout are read;

activating one of said reset lines thereby resetting each of said active pixel circuits in one of said rows of active pixel circuits and storing a signal related to the value of said voltage of said power supply at the time said active pixel circuits in that said row are reset in said first dummy storage register;

activating one of said row select lines thereby reading said active pixel circuits in that said row of active pixel circuits, storing a readout signal in said column registers, and storing a signal related to the value of said voltage of said power supply at the time said active pixel circuits in that said row of active pixel circuits are read in said second dummy register; and using the signals stored in said column registers, said first dummy register, and said second dummy register to correct for fluctuations of said voltage of said power supply.

12. The method of claim 11 wherein said photo detector comprises a photodiode and each of said active pixel circuits comprises a first reset transistor and a first row select transistor.

13. The method of claim 12 wherein each of said first reset transistors has a source in electrical communication with said power supply.

14. The method of claim 12 wherein each of said first reset transistors in each of said rows of active pixel circuits has a gate connected to said reset line for that said row of active pixel circuits.

15. The method of claim 12 wherein each of said first row select transistors has a drain in electrical communication with said column register for that said column of pixel circuits.

16. The method of claim 12 wherein each of said first row select transistors in each of said rows of active pixel circuits has a gate connected to said row select line for that said row of active pixel circuits.

17. The method of claim 11 wherein each of said first dummy pixels comprises a second reset transistor, and wherein each of said second reset transistors in each of said rows of active pixel circuits has a gate connected to said reset line for that said row of active pixel circuits, a source in electrical communication with said power supply, and a drain in electrical communication with said first dummy register.

18. The method of claim 11 wherein each of said second dummy pixels comprises a second row select transistor, and wherein each of said second row select transistors in each of said rows of active pixel circuits has a gate connected to said row select line for that said row of active pixel circuits, a source in electrical communication with said power supply, and a drain in electrical communication with said second dummy register.

19. The method of claim 11 further comprising a subtraction circuit for determining the difference between said signal stored in said first dummy register and said signal stored in said second dummy register.

20. The method of claim 11 further comprising an addition or a subtraction circuit for correcting said signals stored in each of said column storage registers for fluctuations of said voltage of said power supply.

* * * * *